Nov. 2, 1948.  I. M. WHITE ET AL  2,453,055
TURBINE SEAL
Filed July 29, 1946  2 Sheets-Sheet 2
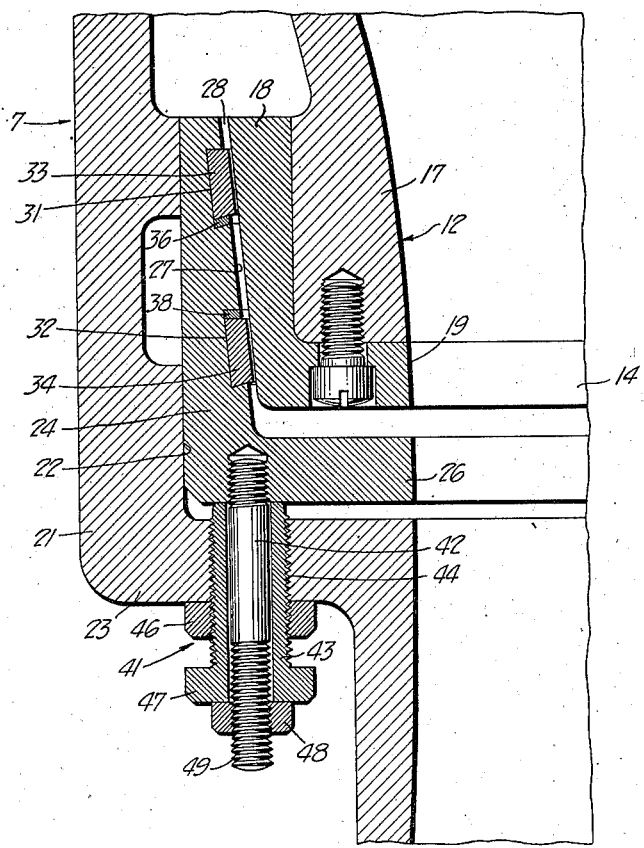
FIG_2_
INVENTORS
Ira Morgan White
BY Hilding E. Nelson
Marcus Lothrop Patented Nov. 2, 1948

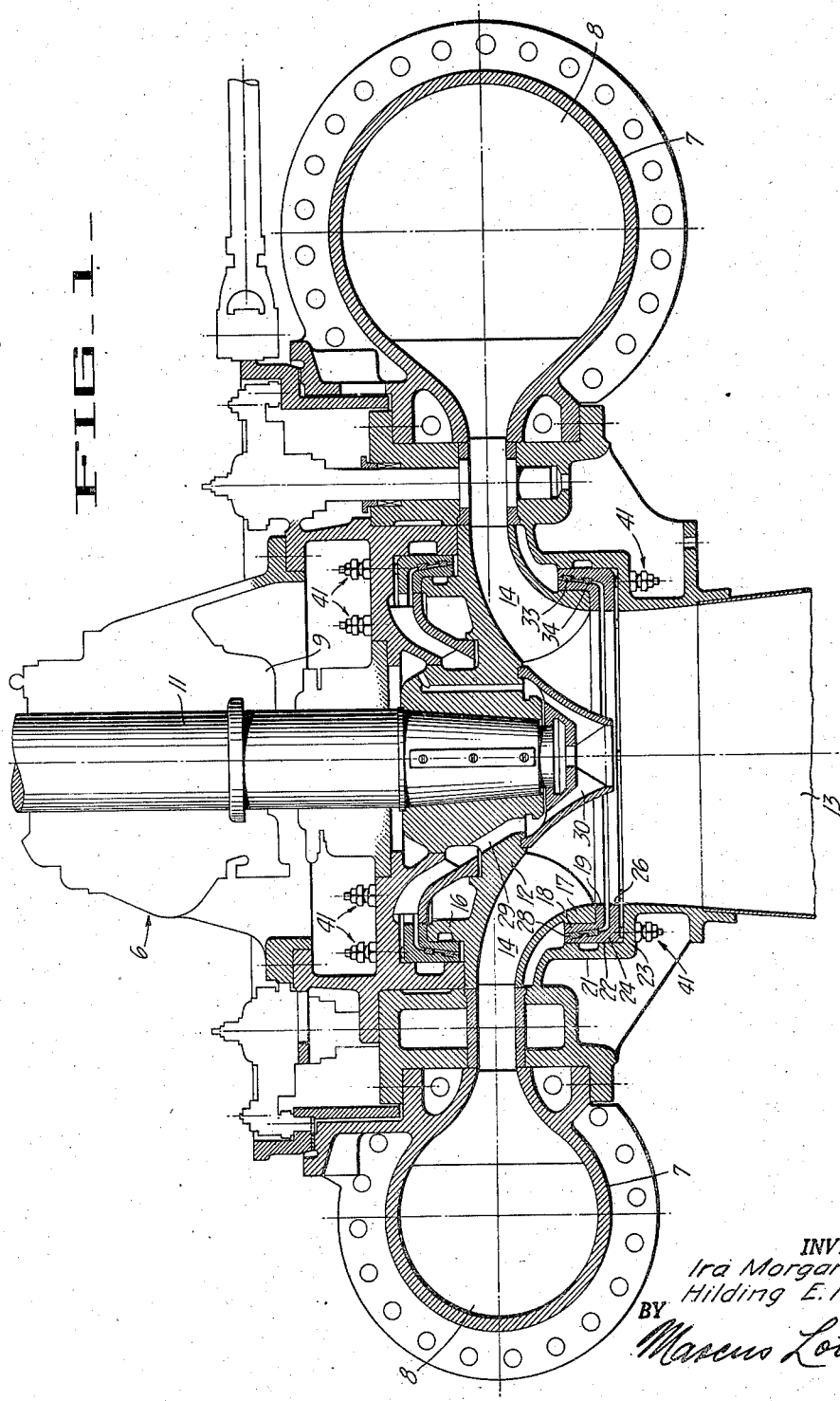

2,453,055

UNITED STATES PATENT OFFICE 2,453,055

TURBINE SEAL

Ira Morgan White, Walnut Creek, and Hilding E. Nelson, San Francisco, Calif., assignors to The Pelton Water Wheel Company, San Francisco, Calif., a corporation of California Application July 29, 1946, Serial No. 686,998

1 Claim. (Cl. 286—7)

Our invention relates to turbine seals and particularly to means for regulating the flow of leakage water in large water wheels or hydraulic turbines particularly of the type shown in Patent No. 1,682,339, issued to Ely C. Hutchinson, assignor to the Pelton Water Wheel Company, the present assignee.

While a full discussion of the environment of the present structure is included in the Hutchinson patent, it is pointed out generally that water leakage past or between the runner and the casing of a large hydraulic turbine is a source of considerable loss. Yet, it is not practically possible to provide a closely machined fit between the runner and the casing in large-size equipment, not only due to manufacturing difficulties but likewise due to distortions arising after manufacture, and also due to variations arising out of temperature changes, arising out of "creep" of some of the materials used and arising from other causes. Even if a quite tight running connection were established between the runner and the casing, it is likely that silt and other abrasives in the turbine water would eventually enlarge the clearance space so that ultimately the loss of working fluid by leakage would be serious.

It is therefore an object of our invention to provide an improved turbine seal.

Another object of the invention is to provide a turbine seal in which the clearance between the runner and the casing can be established at an optimum value.

An additional object of the invention is to provide means for obviating the deleterious effects of abrasives in the working fluid upon the turbine seal.

A still further object of the invention is to provide a seal having a means for compensating for necessary manufacturing tolerances and for distortions and variations in contour that cannot normally be controlled in manufacture.

Other objects together with the foregoing are attained in the embodiment of our invention shown in the accompanying drawings in which Figure 1 is a cross section on a transverse axial plane through a turbine having a seal incorporated therein pursuant to our invention, certain portions of the turbine being shown in outline.

Figure 2 is a cross section similar to Figure 1, but showing to a greatly enlarged scale a portion of the turbine seal embodying our invention.

While our turbine seal is capable of incorporation in many structures other than turbines, and while it can be embodied in many different forms, it is exemplified herein as including structure incorporated in a turbine having a casing and a runner. An annulus is disposed on the runner and a similar annulus is disposed to slide within the casing so that facing conical surfaces on the two annuli can be approached or withdrawn from each other by adjusting and locking means accessible from the exterior of the casing, and so as to provide any selected clearance between the conical surfaces and consequently to regulate or control the amount of turbine fluid flow through the seal.

In the form of the invention disclosed in the accompanying drawings, there is provided a turbine generally designated 6 having a turbine casing 7. This is of generally spiral plan and includes a peripheral scroll or passage 8 serving as an inlet for the turbine fluid, normally water. The casing 7 includes suitable construction serving as a bearing support 9 for a turbine shaft 11 extending to a driven device usually an electric generator. The shaft at one end carries a runner 12. The turbine runner is a composite structure and is rotatable within the casing 7 between the water inlet 8 and a water outlet 13 concentric with the shaft 11. Suitable hydraulic passages 14 are formed in the runner 12 so that water is received peripherally from the inlet passage 8, flows through the passages 14 imparting rotary energy to the runner and is discharged through the outlet 13.

It is necessary to seal the rotary runner within the stationary casing with a relatively high degree of accuracy, yet this must be done in such a way as to provide for inaccuracies in manufacture, for variations in dimensions during operation and for compensation for wear over an extended period. The leakage of water from the inlet 8 to the outlet 13 past the runner without going through the work passages 14 must be maintained at a minimum value since the efficiency of the turbine is of the utmost importance.

To accomplish these aims, we provide the runner 12 with a special configuration resulting in a shoulder or hub 16 disposed on one side of the median plane of the runner and a similar shoulder or hub 17 of slightly smaller diameter on the other side of the median plane of the runner. Since the structures on opposite sides of the median plane are substantially duplicates of each other with the exception of some dimensions, a description of one of them applies equally to the other. On the external surface of the shoulder 17 for example, an annulus 18 is appropriately and non-rotatively secured relative to the runner and provides an inturned flange 19 terminating co-extensively with and forming a continuation of the work passage 14. The external surface of the annulus 18 is preferably not cylindrical but rather is conical or constitutes a truncated cone co-axial with the runner shaft 11. Preferably the annulus 18 is fabricated of a special material different from that of the runner itself and having especial qualities of hardness and abrasion resistance to reduce the effects of sand or comparable abrasives in the turbine water.

To cooperate with the annulus 18 there is provided a complementary structure including an especially contoured portion 21 of the casing 7 arranged to have a circular-cylindrical inner surface 22 co-axial with the shaft axis 11 and also having an adjacent wall 23 of approximately radial extent merging with the wall 21 and with the outlet wall of the passage 13. Slidably engaging the interior surface of the wall 21 is a second annulus 24 formed with a cooperating cylindrical surface and an inturned flange 26 serving as a strengthening and stiffening member and terminating to form substantially a continuation of the interior surface of the passage 13. Furthermore, the second annulus 24 has an internal conical or truncated cone surface 27 of substantially the same inclination or slope as that of the annulus 18 so that between the surfaces of the annuli 18 and 24 there is provided a parallel-sided intermediate conical passage 28. This permits leakage communication of fluid not entering the work passage 14 from the inlet 8 to shunt the work passage and flow into the outlet passage 13 on the downstream side of the runner. Leakage or shunting flow on the other side of the runner is accommodated by a drain channel 29 extending through the runner and having a port 30 opening into the outlet 13.

Because in special circumstances of fine adjustment the surfaces of the annuli 18 and 24 might otherwise come into contact and ultimately wear, we provide an arrangement, shown especially enlarged in Figure 2, so that such wear occurs on special surfaces capable of replacement.

For example, the annulus 24 is provided with a pair of internal circumferential grooves 31 and 32 trapezoidal in cross section or rabbeted in the material or undercut. Each of them receives its respective one of a pair of wear rings 33 and 34 of similar cross sectional contour but of somewhat lesser width. The rings are positioned in their grooves and are firmly locked or held removably in position by inwardly movable keeper rings 36 and 38. The rings 33 and 34 are of slightly less diameter than the annulus 24 so that they rather than the annulus 24 first contact the surface of the annulus 18 and if any wear occurs the rings 33 and 32 themselves take the wear. They can readily be replaced when desired.

In order that the relative position of the annuli can be established with precision, we provide a series of adjusting devices, generally designated 41, arranged peripherally around the casing 7 and preferably passing through radial casing walls for ready accessibility exteriorly of the turbine. For example, the annulus 24 is provided at appropriate intervals with one of a series of studs 42 screwed into the annulus and extending through the interior of a sleeve 43. Exteriorly the sleeve is threaded to engage the threads of an aperture 44 piercing the adjacent wall 23 of the casing. The sleeve 43 abuts the adjacent flange 26 of the annulus and is held in set position by a locknut 46 threaded on the sleeve and likewise jammed against the wall 23. The sleeve 43 at its outer end is provided with an enlarged non-circular head 47 for the reception of a suitable operating tool. A locknut 48 threaded onto the outer threaded end 49 of the stud 42 crowds the head 47. With this arrangement of adjusting devices suitably spaced around the periphery of the annulus 24, the nuts 46 and 48 can be loosened. The sleeves 43 can be rotated to advance the annulus 24 axially to approach the annulus 18 or can be rotated with the help of the nuts 48 to retract the annulus 24 and increase the clearance space 28. When an appropriate setting has been accomplished by sliding the outer annulus within the casing 7, the nuts 46 and 48 are again jammed tightly or locked and the structure is fixed in regulated position.

The arrangement provides a regulated or predetermined leakage path having a desired cross sectional area between the casing of the turbine and both sides of the runner. A slight motion of the adjusting structure provides a precise setting between the runner and the casing and permits a reduction of the leakage of hydraulic fluid to a minimum value consistent with safe clearances between the rotating runner and the casing. In the event of ultimate wear, the adjustments can be slacked, the rings 33 and 34 can be replaced and the structure again reassembled and readjusted for restoration of the original and optimum working conditions.

We claim:

A hydraulic turbine seal comprising a turbine casing having a cylindrical inner wall and an adjacent radial wall merging with a smaller cylindrical wall, a sealing annulus in said casing slidable on said inner wall and having a radial flange adjacent said radial wall and terminating in registry with said smaller cylindrical wall, said annulus having a conical inner surface, a turbine runner in said casing having a cylindrical outer surface and an inner surface in registry with said smaller cylindrical wall, a second annulus engaging said runner outer surface and having a radial flange terminating in registry with said smaller cylindrical surface, said second annulus having a conical outer surface, and means extending through said radial wall of said casing and engaging said sealing annulus for sliding said sealing annulus toward and away from said second annulus in response to manipulation outside said casing.

IRA MORGAN WHITE.
HILDING NELSON.

REFERENCES CITED

The following references are of record in the file of this patent:

UNITED STATES PATENTS

| Number | Name | Date |
|--------|------|------|
| 827,230 | Goeppinger | July 21, 1906 |
| 890,355 | Goeriz | June 9, 1908 |
| 1,238,731 | Anderson | Sept. 4, 1917 |
| 1,614,120 | Halliwell | Jan. 11, 1927 |
| 1,682,339 | Hutchinson | Aug. 28, 1928 |
| 1,835,877 | Joyce | Dec. 8, 1931 |